(12) United States Patent
Christenson

(10) Patent No.: US 9,225,549 B2
(45) Date of Patent: Dec. 29, 2015

(54) MULTI-CHASSIS LINK AGGREGATION IN A DISTRIBUTED VIRTUAL BRIDGE

(75) Inventor: David A. Christenson, Fergus Falls, MN (US)

(73) Assignee: LENOVO ENTERPRISE SOLUTIONS (SINGAPORE) PTE. LTD., Singapore (SG)

( * ) Notice: Subject to any disclaimer, the term of this patent is extended or adjusted under 35 U.S.C. 154(b) by 340 days.

(21) Appl. No.: 13/567,694

(22) Filed: Aug. 6, 2012

(65) Prior Publication Data

US 2014/0036924 A1 Feb. 6, 2014

(51) Int. Cl.
| H04L 12/46 | (2006.01) |
| H04L 12/713 | (2013.01) |
| H04L 12/721 | (2013.01) |
| H04L 12/709 | (2013.01) |

(52) U.S. Cl.
CPC .......... *H04L 12/4641* (2013.01); *H04L 45/245* (2013.01); *H04L 45/586* (2013.01); *H04L 45/66* (2013.01); *Y02B 60/33* (2013.01)

(58) Field of Classification Search
CPC .................................................. H04L 12/4625
USPC ........................... 370/225, 228, 338, 392, 402
See application file for complete search history.

(56) References Cited

U.S. PATENT DOCUMENTS

| 6,910,149 | B2 | 6/2005 | Perloff et al. |
| 7,639,605 | B2 | 12/2009 | Narayanan et al. |
| 8,059,638 | B2 | 11/2011 | Nam et al. |
| 2008/0018196 | A1 | 1/2008 | Enomoto et al. |
| 2009/0207834 | A1 | 8/2009 | Wakumoto et al. |
| 2010/0020680 | A1* | 1/2010 | Salam et al. ................... 370/225 |
| 2010/0215042 | A1 | 8/2010 | Sato et al. |
| 2010/0290472 | A1 | 11/2010 | Raman et al. |
| 2011/0085570 | A1 | 4/2011 | Kotha et al. |
| 2011/0103396 | A1 | 5/2011 | Cardona et al. |
| 2011/0258340 | A1 | 10/2011 | Armstrong et al. |
| 2011/0261827 | A1 | 10/2011 | Armstrong et al. |
| 2012/0033669 | A1* | 2/2012 | Mohandas et al. ............ 370/392 |
| 2012/0033678 | A1* | 2/2012 | Page et al. ..................... 370/401 |
| 2012/0182866 | A1* | 7/2012 | Vinayagam et al. .......... 370/228 |
| 2012/0314715 | A1* | 12/2012 | Janardhanan ................. 370/402 |
| 2013/0028072 | A1* | 1/2013 | Addanki ....................... 370/218 |
| 2013/0188625 | A1* | 7/2013 | Setia et al. .................... 370/338 |

OTHER PUBLICATIONS

Cisco Systems, Inc., "Carrier Ethernet Configuration Guide, Cisco IOS Release 122SR—Multichassis LACP," Oct. 2, 2011.
Brocade, "Multi-Chassis Trunking for Resilient and High-Performance Network Architectures.".

(Continued)

*Primary Examiner* — Jung Park
*Assistant Examiner* — Chuong M Nguyen
(74) *Attorney, Agent, or Firm* — Patterson & Sheridan, LLP

(57) ABSTRACT

Techniques are described for routing data frames using a distributed virtual bridge in a highly integrated networked system. The distributed virtual bridge creates and manages a type of LAG referred to as "unified link aggregation group" (ULAG). Two or more link aggregation groups that span multiple physically-separated switches or chassis (referred to as MLAGs) are unified or aggregated to form a ULAG. Applications view the ULAG as a single logical link, and as long as at least one of the sub links in any of the MLAGs that are part of the ULAG is operational, network connectivity is maintained.

20 Claims, 8 Drawing Sheets

(56) References Cited

OTHER PUBLICATIONS

HP, "3500-5400-6200-6600-8200 Management and Configuration Guide—Port Trunking—Distributed Trunking.".
IEEE 802.1AX-2008, Link Aggregation, p. 1-78.
Martini et al, IEEE, "Inter-Chassis Communication Protocol for L2VPN PE Redundancy," Oct. 13, 2010.
Cisco Systems, Inc., "Cross-Stack EtherChannel on a Catalyst 3750 Switch Configuration Example.".
Cisco Systems, "Best Practices in Deploying Cisco Nexus 1000V Series Switches on Cisco UCS B and C Series Cisco UCS Manager Servers." White Paper, Apr. 2011.
Cisco Nexus 7000 Series Connectivity Solutions for the Cisco Unified Computing System. White Paper, 2010.
SysKonnect, "Link Aggregation according to IEEE 802.3ad." White Paper.
Juniper Networks, Inc., "Configuring Multi-Chassis Link Aggregation.".

* cited by examiner

MULTI-CHASSIS LINK AGGREGATION IN A DISTRIBUTED VIRTUAL BRIDGE

BACKGROUND

In computer networking, link aggregation allows one or more network connections (i.e., links) to be aggregated together to form a Link Aggregation Group (LAG), such that a network client can treat the LAG as if it were a single link. Link aggregation has enabled networking devices to increase throughput and provide redundancy should one of the links within the LAG fail. While link aggregation may be applied across various layers (i.e., of the OSI model), link aggregation is typically applied to the data link layer (i.e., Layer 2), where aggregation occurs across ports of a physical switch. The IEEE 802.1ax standard, which defines link aggregation in detail, stipulates that all the links in a LAG should belong to the same physical switch.

SUMMARY

Embodiments of the disclosure provide a method, product and system for performing an operation for routing a data frame through a network system having a plurality of chassis. The operation includes receiving a data frame to be forwarded to a virtual local area network (VLAN) and determining one of a plurality of link aggregation groups mapped to the VLAN. Each link aggregation group may include a first sub link from one of a plurality of chassis and a second sub link from another one of the plurality of chassis. The operation further includes selecting one of the plurality of sub links from the determined link aggregation group based on routing information of the data frame, and transmitting the data frame on the selected sub link.

Embodiments of the disclosure further provide a method of routing a data frame through a network system having a plurality of chassis. The method includes receiving a broadcast data frame at an ingress port associated with a virtual local area network (VLAN) and identifying one of a plurality of link aggregation groups mapped to the VLAN. Each link aggregation group may include a first sub link from one of the plurality of chassis and a second sub link from another one of the plurality of chassis. The method further includes determining whether the ingress port belongs to the identified link aggregation group, and responsive to determining that the ingress port belongs to the identified link aggregation group, forwarding the broadcast data frame, or responsive to determining that the ingress port does not belong to the identified link aggregation group, discarding the broadcast data frame.

Embodiments of the disclosure provide a system having a plurality of chassis. The system includes a plurality of server computers, and a plurality of bridge elements coupled to the plurality of server computers. The plurality of bridge elements are configured to receive a data frame to be forwarded to a virtual local area network (VLAN). The plurality of bridge elements are configured to execute a routing operation that includes determining one of a plurality of link aggregation groups mapped to the VLAN, wherein each link aggregation group includes a first sub link from one of the plurality of chassis and a second sub link from another one of the plurality of chassis. The routing operation further includes selecting one of the plurality of sub links from the determined link aggregation group based on routing information of the data frame, and transmitting the data frame on the selected sub link.

So that the manner in which the above recited aspects are attained and can be understood in detail, a more particular description of embodiments of the disclosure, briefly summarized above, may be had by reference to the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

Embodiments of the disclosure provide a distributed aggregator component comprising multiple bridge elements positioned within a highly integrated and scalable network. The distributed bridge elements may comprise part of a distributed virtual bridge that spans multiple server computers. To accommodate the relatively high level of system integration, distributed bridge elements may be programmed to perform Layer-2 switching functions and to independently route data frames. The bridge elements may accomplish operational and frame-forwarding decisions in parallel by distributing load balancing determinations.

The distributed virtual bridge may control and manage groupings of sub links, or link aggregation groups (LAGs). Using a technique referred to as multi-chassis LAG (or MLAG), link aggregation groups may span multiple physically-separated switches or chassis to provide improve redundancy and fault tolerance. However, in other approaches to MLAG, a given virtual local area network (VLAN) may only use sub links belonging to the same MLAG. Consider an exemplary network topology that has one VLAN ("VLAN1") belonging to a MLAG ("MLAG1"), and another VLAN ("VLAN2") belonging to another MLAG ("MLAG2"). If MLAG1 fails, VLAN1 can be moved to MLAG2, however, VLAN1 is not permitted to utilize the combined bandwidth of links in both MLAG1 and MLAG2. In previous approaches, this restriction of a VLAN to a single MLAG is necessary to prevent Layer-2 networking loops (e.g., broadcast storms).

According to an embodiment of the present disclosure, the distributed virtual bridge creates and manages a type of LAG referred to as "unified link aggregation group" (ULAG). The networking construct of the ULAG enables a VLAN to concurrently use sub links belonging to multiple MLAGs. Two or more MLAGs are unified or aggregated to form a ULAG.

Figure 2:
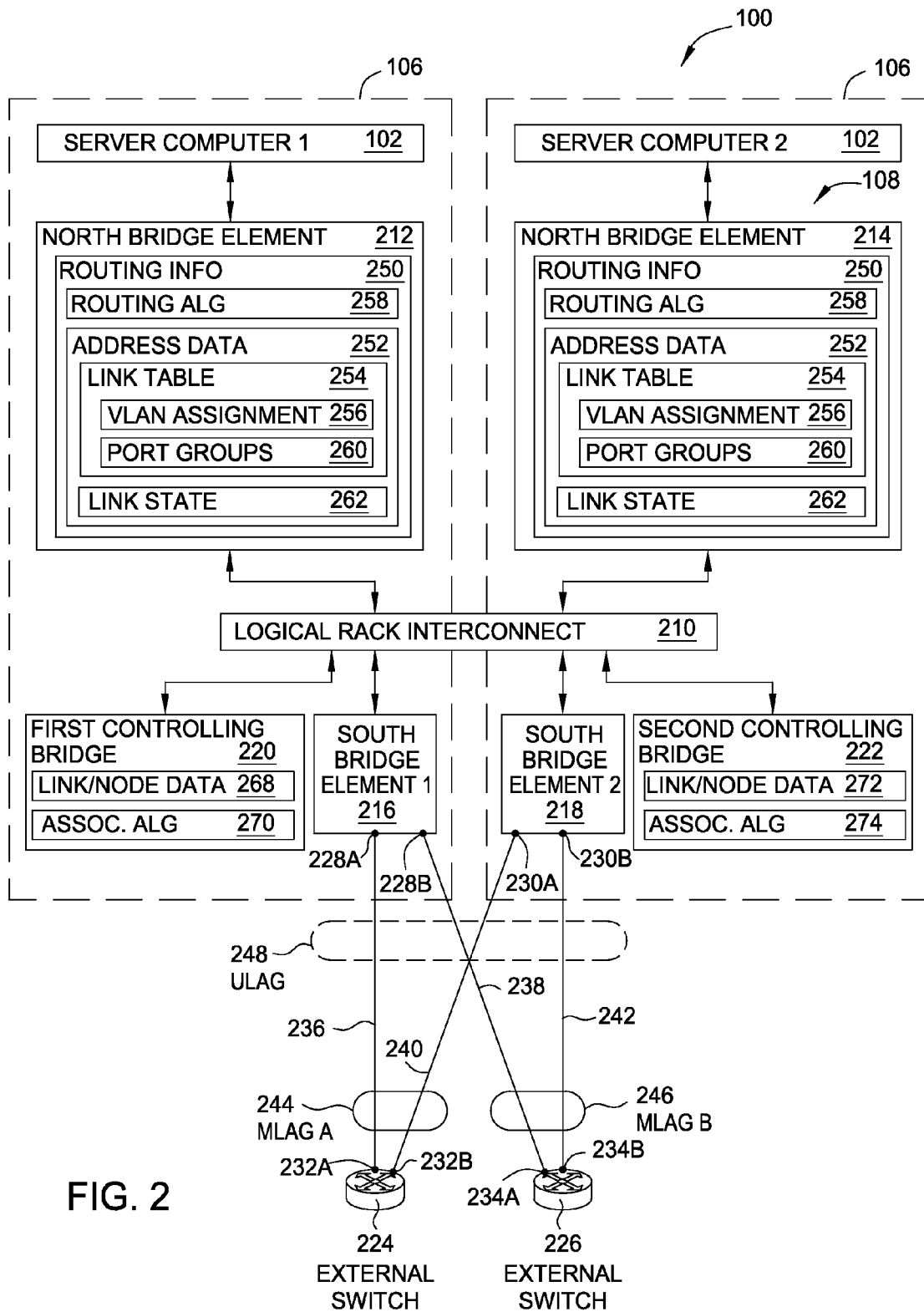
FIG. 2 is a more detailed view of an embodiment of the integrated computing system of FIG. 1.

Applications view the ULAG as a single logical link, and as long as at least one of the sub links in any of the MLAGs that are part of the ULAG is operational, network connectivity is maintained. For example, in contrast to the example considered above, a network topology (such as illustrated in FIG. 2) may include VLAN1 and VLAN2 that belong to both MLAG1 and MLAG2. The ULAG comprised of MLAG1 and MLAG2 is treated as a single logical link and therefore prevents Layer-2 loops. Accordingly, the distributed virtual bridge advantageously enables VLAN1 and VLAN2 to fully utilize the combined bandwidth of MLAG1 and MLAG2.

For outgoing data frames, the distributed virtual bridge selects a sub link from amongst the sub links of the ULAG according to address information contained within the data frames. For example, the distributed virtual bridge forwards data frames on a particular sub link of a particular MLAG according to a source address of the egress data frames (e.g., using a hash value of the source MAC address). For incoming data frames, particularly ingress broadcast traffic, the distributed virtual bridge performs data frame filtering at all sub links of the ULAG according to address information contained within the data frames. As such, the distributed virtual bridge prevents network loops and avoids duplicate packets by using the source (MAC) address to select a single sub link for packet forwarding. By using the source address to select the broadcast sub link, rather than merely designating one of the sub links for all broadcast traffic, the distributed virtual bridge advantageously allows broadcast traffic to be load balanced across all of the sub links without any danger of a network loop.

In the following, reference is made to embodiments of the disclosure. However, it should be understood that the aspects of present disclosure are not limited to specific described embodiments. Instead, any combination of the following features and elements, whether related to different embodiments or not, is contemplated to implement and practice aspects of the present disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access web pages and gadgets and any related data available in the cloud. For example, the gadget may request information or a data feed from a process executing on a computing system in the cloud. In another example, the library of available gadgets may be stored at a storage location in the cloud. Doing so allows the gadgets and any related information to be accessed from any computing system attached to a network connected to the cloud (e.g., the Internet).

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
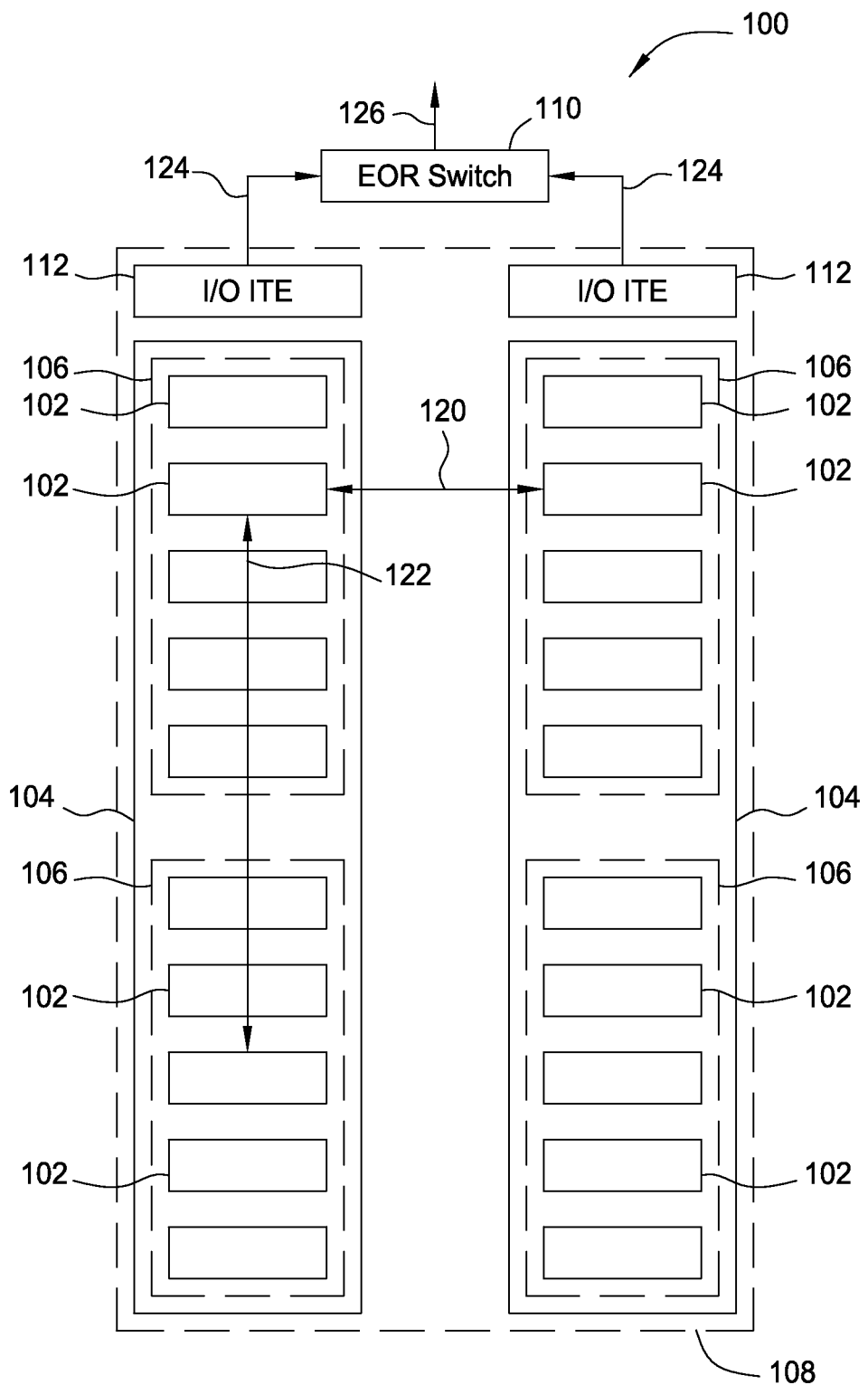
FIG. 1 is a block diagram of an integrated computing system configured to forward data frames using a distributed virtual bridge, according to an embodiment of the disclosure.

FIG. 1 is a block diagram of an integrated computing system 100 configured to forward data frames using a distributed virtual bridge 108, according to an embodiment of the disclosure. The computing system 100 includes a plurality of server computers 102 housed within racks 104 and arranged into a plurality of interconnected chassis 106. An illustrative server computer 102 may include a half-width information technology element (ITE) blade server computer.

The distributed virtual bridge 108 is comprised of multiple distributed bridge elements (shown in detail in FIG. 2). In the embodiment shown in FIG. 1, the distributed virtual bridge 108 may extend across server computers 102, chassis 106, and racks 104 to provide data link layer (e.g., Layer 2) switching between bridge elements. The bridge elements may provide a frame-based, Ethernet-like interface. The interface may facilitate lossless, point-to-point, in-order frame delivery between server computers 102 of different racks 104 or chassis 106 with reduced redundancy and latency.

Unlike conventional approaches using a top of rack or chassis switch, the distributed bridge element of the distributed virtual bridge 108 enables direct connectivity between server computers 102 located in different racks 104 or chassis 106. Data frame communications between the server computers 102 housed within different chassis 106 or racks 104 are generally referred to as "east-west" connectivity. For example, an arrow 120 shown in FIG. 1 represents direct east-west connectivity and the flow of data frames between server computers 102 located in different racks 104 of the system 100. In another example, an arrow 122 represents direct east-west connectivity between server computers 102 across different chassis 106 of the same rack 104. The distributed virtual bridge 108 may route the data frame based upon a media access control (MAC) address.

The computing system 100 further includes an end-of-rack (EOR) switch 110 and input/output (I/O) server ITEs 112 that enable "north-south" connectivity (i.e., internal to external data frame communication). The I/O server ITEs 112 may enable uplink connectivity to the external Ethernet network (or other network) for the server computers 102 housed within the racks 104, as illustrated by the arrows 124 and 126.

FIG. 2 illustrates one embodiment of the integrated computing system 100 having server computers 102 arranged within multiple interconnected chassis 106, according to an embodiment of the disclosure. While the embodiments shown in FIG. 2 depict a single server computer 102 within chassis 106, it should be recognized that multiple server computers may executed within each chassis. It should be further recognized that the server computers 102 may be one or more virtual machines (VMs) that are software implementations of a computer and are configured to execute programs in a manner similar to a physical machine. An example of a highly integrated computing system 100 is further described in more detail in U.S. patent application Ser. No. 12/767,174 , filed Apr. 26, 2010, entitled "Distributed Link Aggregation," and is incorporated herein by reference.

The integrated computing system 100 includes a distributed virtual bridge 108 configured to route data frames in a distributed manner. The distributed virtual bridge 108 includes north bridge elements 212, 214 and south bridge elements 216, 218 connected to each other by a logical rack interconnect (LRI) 210. The LRI 210 divides components within interconnected chassis 106 into "north" (i.e., ingress) and "south" components and facilitates point-to-point connections between the bridge elements 212, 214, 216, and 218 without frame loss and with in-order frame delivery. In the embodiment shown, a first north bridge element 212 is connected to the first server computer 102 and is arranged within the first chassis 106 with a first south bridge element 216. The second north bridge element 214 is connected to the second server computer 102 and is arranged within the second chassis 106 with a second south bridge element 218. The distributed virtual bridge 108 further includes a first controlling bridge 220 within the first chassis 106 and a second controlling bridge 222 within the second chassis 106, both coupled to the LRI 210.

The south bridge elements 216 and 218 include a plurality of uplink ports 228A, 228B, 230A, 230B that may be connected to one or more external networking devices, such as external switches 224 and 226. Each of the south bridge elements 216 and 218 may be connected to each of the external switches 224, 226 to provide a plurality of links that may be used in link aggregation. For example, in the embodiment shown, a port 228A of the first south bridge element 216 is connected to a port 232A of the external switch 224 by a link 236. A port 228B of the first south bridge element 216 is connected to a port 234A of the external switch 226 by a link 238. Similarly, a port 230A of the second south bridge element 218 is connected to a port 232B and 234B of the external switches 224 and 226 via link 240 and link 242, respectively. External switches 224 and 226 are configured to support link aggregation that associates one or more ports in groups that may be viewed as belonging to a same physical system, e.g., as defined by IEEE 802.3ax standard, or "Link Aggregation Control Protocol" (LACP).

In one embodiment, the distributed virtual bridge 108 organizes the links 236, 238, 240, and 242 into link aggregation groups (LAGs) which constitute ports terminating on separate chassis, sometimes referred as multi-chassis link aggregation groups (MLAGs). In the embodiment shown, the links 236, 238 may be associated with a first MLAG 244 having ports 228A and 230A that end on separate chassis 106. The links 240, 242 may be associated with a second MLAG 246 having ports 228B and 230B that also end on separate chassis 106. According to embodiments of the present disclosure, the distributed virtual bridge 108 merges the MLAGs 244 and 246 to form a single LAG referred to herein as a unified link aggregation group (ULAG) 248 and is described in further detail later.

The controlling bridges 220, 222 may control access to external links (e.g., links 236, 238, 240, 242) and may execute Layer-2 (e.g., Ethernet) control plane functions to manage bridge elements 212, 214, 216, and 218. For example, the bridge elements of the distributed virtual bridge 108 may be interconnected and managed using management frames generated by the controlling bridges 220, 222. The controlling bridges 220, 222 may communicate with or otherwise be coupled (remotely or directly) to each bridge element of the distributed virtual bridge 108, for example, through the LRI 210. The controlling bridges 220, 222 may program the bridge elements 212, 214, 216, and 218 using management frames that include a configuration protocol, as described in detail in conjunction with FIG. 7. Further, link aggregation setup, configuration, and operational control may be accomplished by the controlling bridges 220, 222.

The controlling bridges 220, 222 may communicate routing information 250 to bridge elements 212, 214, 216, and 218. By way of example, the first controlling bridge 220 communicates routing information 250 to the first north bridge element 212 and the first south bridge element 216 within first chassis 106. To simplify the description, description of the bridge elements 214, 216, 218 is omitted but it should be understood that the bridge elements 214, 216, and 218 may be configured similarly to the first north bridge element 212. The routing information 250 may include address data 252 and a routing algorithm 258 that enables the bridge elements 212, 214, 216, and 218 to execute link and port aggregation. An illustrative routing algorithm 258 may include a workload balancing component. In one embodiment, the first north bridge element 212 uses the routing algorithm 258 as instructions for routing data frames.

The controlling bridges 220, 222 may monitor link states of each link in the link aggregation groups. The controlling bridges 220, 222 may inform some or all of the bridge elements of any changes affecting the state of a link. As shown in FIG. 2, the north bridge element 212 stores address data 252 that includes a link table 254 and link state information 262. The link state information 262 includes status information pertaining to various links and ports that are associated with the first north bridge element 212.

In one embodiment, the link table 254 may include virtual large area network (VLAN) and logical network (LN) assignments 256 and port group information 260 may be used by the first north bridge element 212 to route data frames, for example, to ports of south bridge elements 216, 218. VLANs generally refer to one or more hosts that share a common set of requirements, and communicate as if the hosts were physically attached to the same division of a network, regardless of the physical location of the hosts. A LN refers to a type of logical network that represents a group of hosts and virtual servers that connect to the same network. For example, a LN can represent either a LAN or a VLAN. LNs enable a system administrator to more easily to assign networks to virtual machines, map virtual appliances to networks defined in a virtualization specification file, and visualize discovered networks and the systems associated with those networks. While embodiments are described herein using both VLANs and LNs, it should be recognized that embodiments of the present disclosure may be implemented using only a single form (e.g., VLAN) to organize networks and communication between devices.

In one embodiment, the VLAN and LN assignments 256 associate VLANs (and LNs) to one or more MLAGs, such as MLAGs 244, 246 to enable VLANs to concurrently use links belonging to multiple MLAGs. While previous approaches to link aggregation restrict a VLAN to belong to a single MLAG, embodiments of the present disclosure enable a VLAN to concurrently use links belonging to multiple MLAGs, thereby advantageously utilizing the combined bandwidth of all MLAGs 244, 246. Further, the techniques described herein utilize link aggregation for uplinks, rather than pinning all traffic originating from a server computer NIC to a single physical uplink. In some embodiments, the VLAN and LN assignments 256 may be represented as a VLAN table which maps each VLANs (and LNs) to one or more MLAGs.

In one embodiment, the port group information 260 provides information pertaining to MLAGs 244, 246 that are associated with one or more uplink ports (e.g., ports 228A, 228B, 230A, 230B). In one implementation, the port group information 260 may be represented as a LAG table which maps each LAG (e.g., or MLAG) to one or more ports (or links) that may be selected for forwarding data frames.

In one embodiment, the controlling bridges 220, 222 are configured to communicate to manage link aggregation for the distributed virtual bridge 108, for example, by using a communication protocol such as IEEE 802.1ax Link Aggregation Control Protocol (LACP). Although the embodiments described utilize a distributed LACP model, it should be recognized that other LACP control architectures may be used, such a "master-and-backup" LACP model.

The first controlling bridge 220 may include link and node data 268. The link and node data 268 may include MAC addresses of ports and/or links to be associated with the north bridge element 212 for routing data frames. The first controlling bridge 220 may also include at least one associating algorithm 270 configured to be used to automatically assign the address data 252 and the routing algorithm(s) 258 to the north bridge elements within the first chassis 106 (e.g., first north bridge element 212.) Similarly, the second controlling bridge 222 may include link and node data 272, as well as an associating algorithm(s) 274. As with the first controlling bridge 220, the second controlling bridge 222 may be configured to provide the north bridge element 214 within the second chassis 106 with routing information, including address data and routing algorithms.

In operation, the first controlling bridge 220 and the second controlling bridge 222 running in each chassis 106 independently negotiate with their LACP partner (e.g., external switches 224, 226) to aggregate one or more links of their respective chassis 106. For example, the first controlling bridge 220 independently negotiate with the external switch 224 (i.e., LACP partner) to aggregate uplink ports 228A, 228B of first south bridge element 216 to form a partial LAG. The second controlling bridge 222 may also independently negotiate with the external switch 226 to aggregate uplink ports 230A, 230B of second south bridge element 218 to form another partial LAG. The controlling bridges 220, 222 may exchange LACP messages to merge the partial LAGs to create and program one or more MLAGs 244, 246 that aggregate ports terminating on separate chassis 106. The controlling bridges 220, 222 then unify the multiple MLAGs 244, 246 to form a type of LAG referred to herein as a unified link aggregation group (ULAG).

Figure 3:
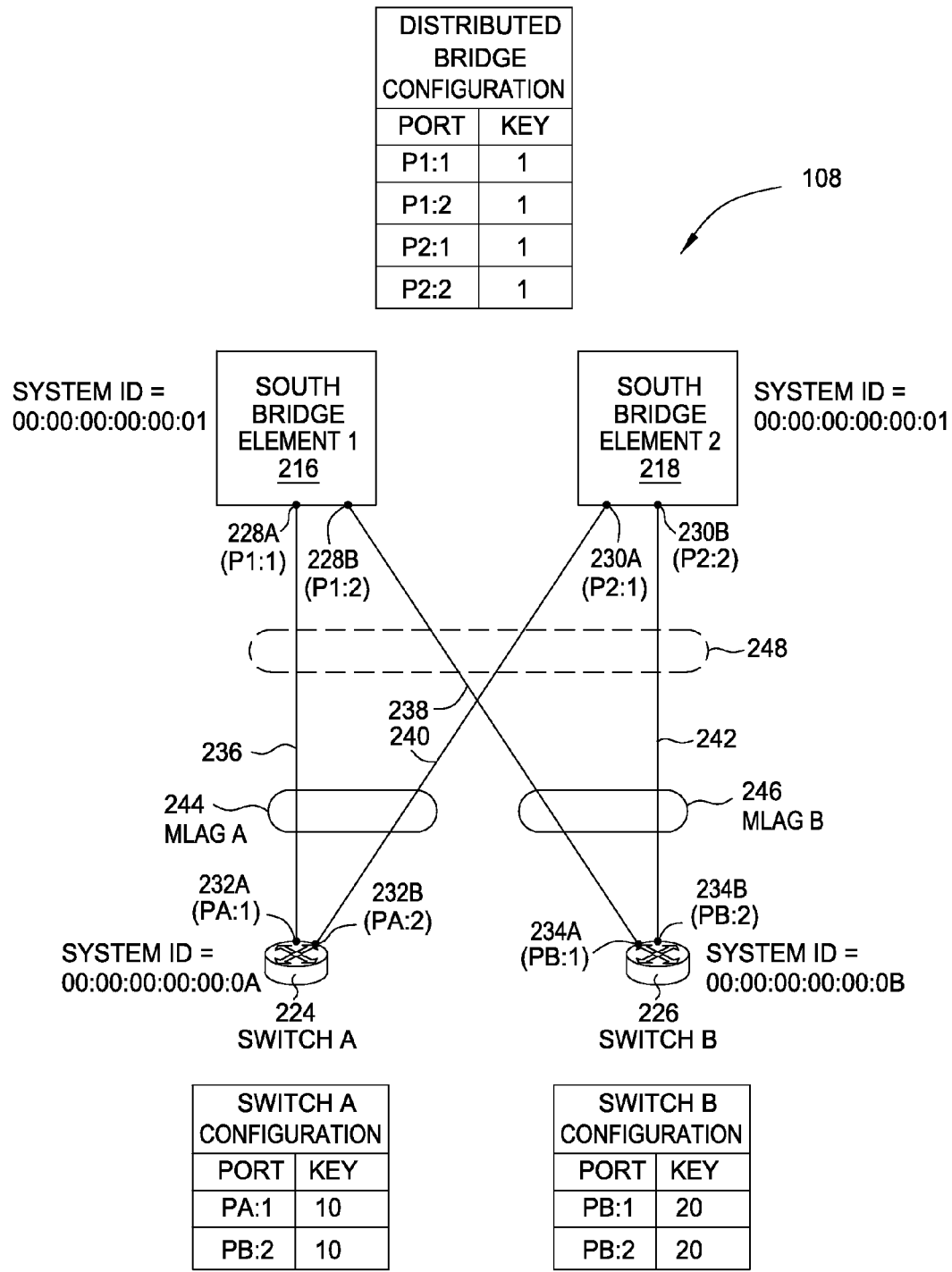
FIG. 3 illustrates one exemplary configuration of the distributed virtual bridge shown in FIG. 2, according to an embodiment of the disclosure.

FIG. 3 illustrates one example configuration of the distributed virtual bridge 108, according to an embodiment of the disclosure. The distributed virtual bridge 108 may use LACP to configure the components of the distributed virtual bridge 108 to support a ULAG network topology. LACP utilizes a number of identifiers to configure how a set of links (e.g., links 236, 238, 240, 242) can aggregate.

A system ID is assigned that uniquely identifies each networking component, and may comprise of a MAC address concatenated with a system priority. In one embodiment, a single system ID may be assigned to all components across all chassis (e.g., chassis 106) of the distributed virtual bridge 108. In the example shown in FIG. 3, both south bridge elements 216, 218 may be assigned a same system ID value of 00:00:00:00:00:01. Further, the external switch 224 may use a system ID of "00:00:00:00:00:0A" and the external switch 226 may use a system ID of "00:00:00:00:00:0B."

Each port is assigned a port ID that unique identifies each port within a particular networking component. In one embodiment, a port ID comprises a port priority concatenated with a port number. In the example shown in FIG. 3, ports 228A, 228B of south bridge element 216 are assigned a port ID of "P1:1" and "P1:2," respectively, and ports 230A, 230B of south bridge element 218 are assigned a port ID of "P2:1" and "P2:2", respectively. Further, the ports 232A, 232B of external switch 224 may be assigned port IDs of PA:1 and PA:2, respectively, and the ports 234A and 234B of external switch 226 is assigned port IDs of PB:1 and PB:2, respectively.

Each port also utilizes capability identification, referred to as an "administrative key," that is used during negotiation for link aggregation. LACP selects a set of ports with matching "local" and "remote system" ID/admin key pairs to form link aggregation groups. In one embodiment, a ULAG 248 may be formed on a "local" system (e.g., distributed by combining two or more MLAGs 244, 246 having matching "local" system ID/admin key pairs. For example, in one embodiment, all ports belonging to the ULAG 248 are assigned a same key value to indicate their common association with ULAG 248.

In the example shown in FIG. 3, ports 228A, 228B, 230A, 230B are assigned the same key value of 1.

It should be recognized that the ULAG 248 includes LAGs from multiple external switches having different "remote" system ID/admin key pairs. For example, the external switch 224 may assign a same key value to all ports belonging to MLAG 244. In the example shown, the external switch 224 may assign the key value of 10 to ports identified as PA:1 and PA:2. Further, the external switch 226 may assign a same key value to all ports belonging to MLAG 246. As such, the external switch 226 may assign a key value of 20 to ports 234A and 234B belonging to MLAG B 246. It should be recognized that external switches (e.g., switches 224, 226) may not be aware of the ULAG 248 that is formed by the distributed virtual bridge 108.

Referring back to FIG. 2, in operation, the controlling bridges 220, 222 may exchange protocol messages with one or more bridge elements (e.g., north bridge elements 212, 214 and south bridge elements 216, 218) to communicate routing information 250 and address data 252 pertaining to the ULAG 248. After the controlling bridges 220, 222 have communicated the routing information 250 to the bridge elements, the north bridge elements 212, 214 may process data frames received from connected server computers 102 and forward each data frame directly to an appropriate external physical uplink port according to the routing information 250. For example, the first north bridge element 212 may be configured to forward data frames to ports 228A, 228B of the first south bridge element 216 and to ports 230A, 230B of the second south bridge element 218. The operations of north bridge elements 212 and 214 are described in further detail in conjunction with FIG. 4 below. The south bridge elements 216, 218 may receive ingress data frames from connected external switches 224, 226 and forward the received data frames to server computers 102 via north bridge elements 212, 214. According to an embodiment, the south bridge elements 216, 218 may also receive broadcast and multicast data frames and forward the received data frames using a technique for source address filtering, as described in conjunction with FIG. 6.

Figure 4:
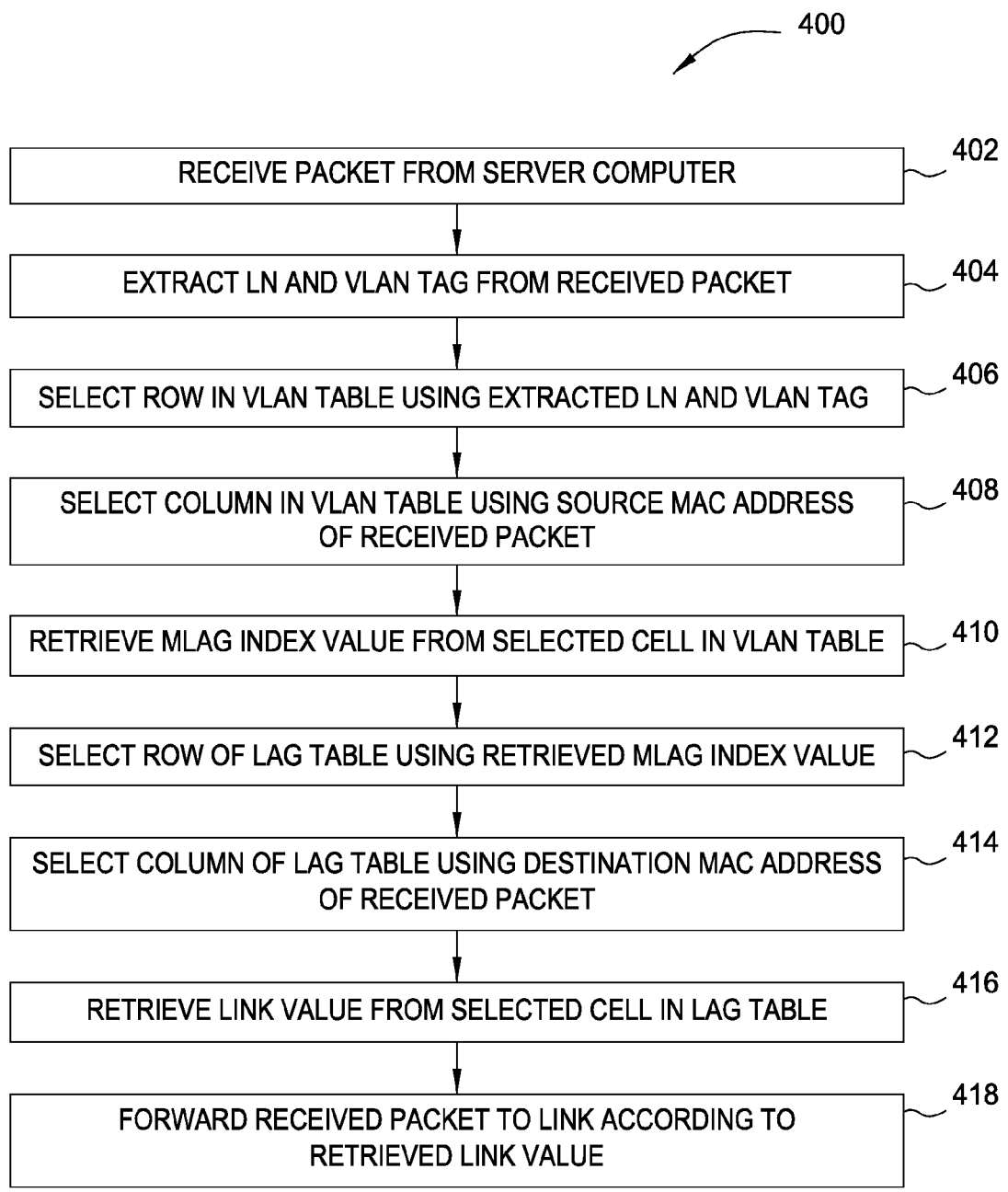
FIG. 4 illustrates a method for routing data frames, according to an embodiment of the disclosure.

FIG. 4 illustrates a method for routing data frames, according to an embodiment of the disclosure. The method 400 begins at step 402, where the first north bridge element 212 receives a data frame from the second server computer 102 for forwarding. The north bridge element 212 processes the data frame and uses address data 252 and link table 254 provided by controlling bridges 220, 222, as described above, to select a link to which to forward the data frame. In some embodiments, selection of a sub-link for routing a data frame may be based upon a link state, a load balancing consideration, and frame data (e.g., address data) of the data frame to be transmitted, among other considerations. Illustrative frame data may include at least one of a Media Access Control (MAC) address, a source port identifier, a source address, a destination address, VLAN tags, LN tags, and an Internet Protocol (IP) address, among other identifying data.

Figure 5:
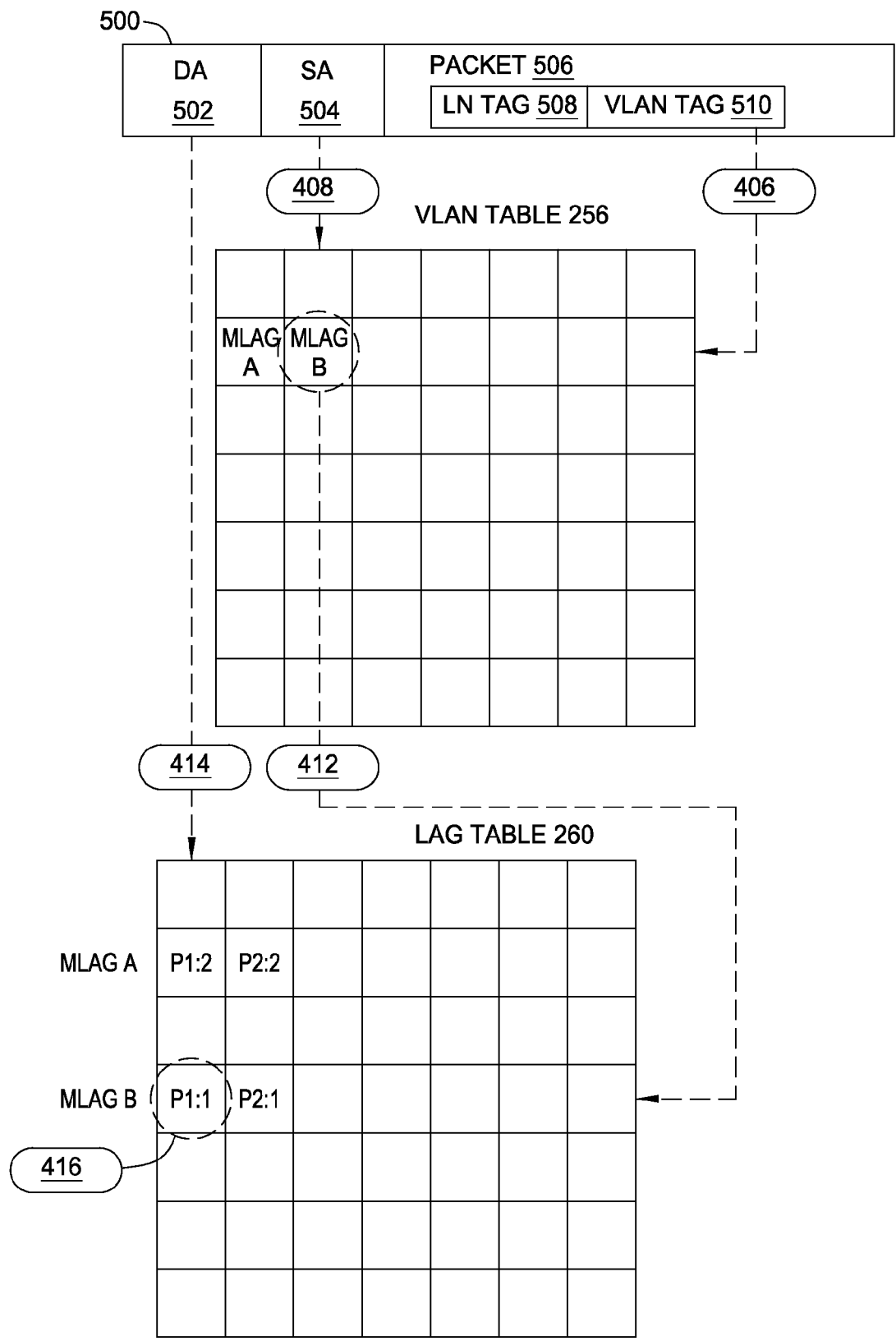
FIG. 5 illustrates a block diagram depicting a data frame routed according to a technique described in the present disclosure.

An example Layer 2 data frame 500 that may be received and processed by the north bridge element 212 is shown in greater detail in FIG. 5. FIG. 5 further illustrates how information from the data frame 500 may be used to select a link to which to forward the data frame 500 and be referred to in conjunction with the explanation of FIG. 4.

The data frame 500 includes a link-layer header having a destination address 502 and source address 504 that indicates which device is expected to receive and process the data frame 500 and which device originated the data frame 500, respectively. The data frame 500 further includes a packet 506 that includes payload data, including headers and metadata for other protocols, e.g., Internet Protocol. In one embodiment, the packet 506 may include a VLAN tag 510 and a LN tag 508 that specifies a VLAN and LN to which the data frame 500 belongs.

Referring back to FIG. 4, in step 404, the north bridge element 212 extracts the LN tag 508 and VLAN tags 510 from the data frame 500. In step 406, the north bridge element 212 uses the extracted LN and VLAN tags to select a row from a VLAN table (e.g., VLAN and LN assignments 256) which associates VLANs with one or more MLAGs (e.g., MLAGs 244, 246). It should be recognized that the north bridge elements may use the VLAN tag 510 alone, rather than in conjunction with the LN tag 508, to select a row from the VLAN table.

In step 408, the north bridge element 212 selects a column from the VLAN table using the source address 504 of the received data frame 500. In some embodiments, the north bridge element 212 may generate a hash value based on a MAC address located in the source address field 504 of the packet header of the data frame 500 to select a column from the VLAN table.

In step 410, the north bridge element 212 retrieves an MLAG index value from the table cell of the row and the column of the VLAN table selected in steps 406 and 408. As described above, rather than restricting a particular VLAN to a single MLAG, embodiments of the present disclosure enable multiple VLANs to belong to multiple MLAGs. Accordingly, the retrieved MLAG index identifies a particular MLAG associated with the VLAN and LN tag of the data frame 500. In the example shown in FIG. 5, the north bridge element 212 has selected "MLAG B" for forwarding the data frame 500 based on the source address 504, VLAN and LN tags 508, 510, and VLAN table 256.

In step 412, the north bridge element 212 uses the MLAG index value retrieved in step 410 to select a row in a LAG table (e.g., port group information 260). In step 414, the north bridge element 212 selects a column of the LAG table using the destination address 502 of the received data frame 500. In some embodiments, the north bridge element 212 generates a hash value based on the destination MAC address located in the packet header (or in other packet header fields) of the data frame 500 to select a column in the LAG table. While the present disclosure describes use of the destination address 502, it should be recognized that embodiments of the present disclosure may be extended to utilize frame data from the other frame fields—alone or in combination—of the received data frame 500 to select a column in the LAG table, including such fields as an EtherType field, a frame check sequence field, and a IEEE 802.1Q tag field that indicates VLAN membership and IEEE 8021p priority.

In step 416, the north bridge element 212 retrieves a link value from a table cell in the row and column in the LAG table selected in steps 412 and 414. In some embodiments, the retrieved link uniquely identifies a port (e.g., port ID) belonging to the MLAG selected in step 410. In the example shown in FIG. 5, the north bridge element 212 selects port P1:1, which corresponds to port 228A of the first south bridge element 216 connected to the external switch 224 via link 236. In step 418, the north bridge element 212 forwards the received data frame 500 to the link selected in step 416. In some embodiment, the north bridge element 212 forwards the data frame 500 to the first south bridge element 216 via LRI 210 to be transmitted by uplink port 228A.

It should be recognized that, even though the method is described in conjunction with the first north bridge element 212 and the systems in FIG. 1 and FIG. 2, any system (including the second north bridge element 214) configured to perform the method steps is within the scope of embodiments of the invention.

While embodiments of the present disclosure may be used to distribute unicast packet flows (e.g., TCP connections) across multiple links of MLAGs 244, 246 with ease, the handling of broadcast and multicast traffic may present some challenges. Broadcast traffic is generally forwarded across every port of network switch, and may result in a flooded network in computer networks having more than one path between two end points (e.g., the multiple links of MLAGs 244, 246.) A conventional approach to avoid broadcast loops is to implement a loop-free logical topology using the spanning tree protocol (STP) on network switches. However, this approach increases the complexity and maintenance cost of the computer network. Another known approach to avoiding broadcast loops is to designate a single sub link to carry all of the broadcast and multicast traffic. However, this approach prevents the full uplink bandwidth of the computer network from being utilized.

Accordingly, embodiments of the present disclosure provide a type of link aggregation group (e.g., ULAG 248) that uses ingress source address hash filtering to prevent broadcast loops and duplicate packets. The ULAG 248 is treated as a single logical link, thereby preventing L2 forwarding loops, and eliminating any need to run STP on the links 236, 238, 240, 242 between the distributed virtual bridge 108 and the external switches 224, 226. Further, the distributed virtual bridge 108 can safely distribute broadcast and multicast traffic across all sub links of the ULAG 248 without the risk of a forwarding loop or bridge table corruption. Distributing broadcast packets across multiple sub links also prevents the overloading of a single sub link and core switch.

Figure 6:
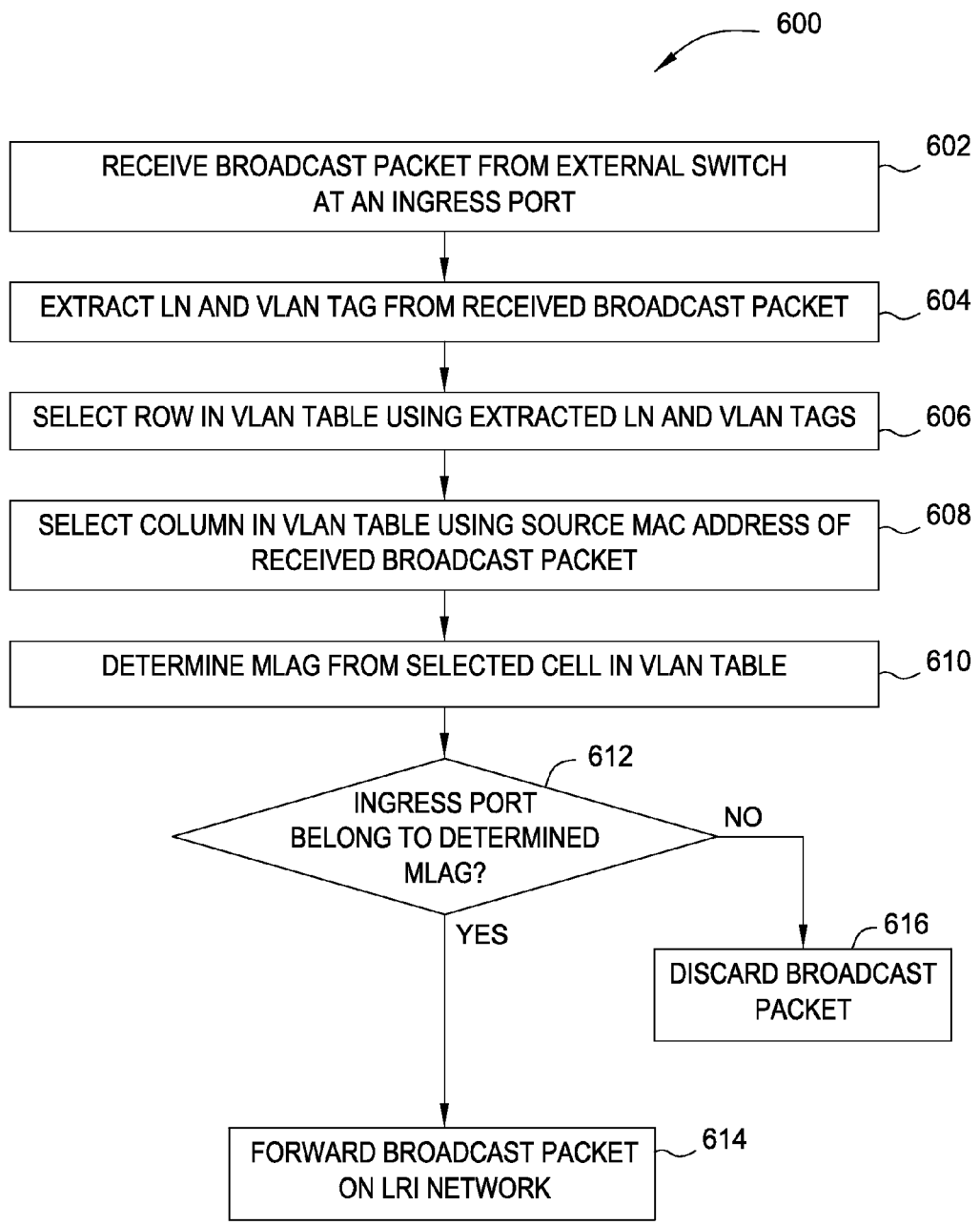
FIG. 6 illustrates a method for routing broadcast data frames, according to an embodiment of the disclosure.

FIG. 6 illustrates a method for routing broadcast data frames, according to an embodiment of the disclosure. In one scenario, the south bridge elements 216, 218 may receive multiple, possibly duplicate, broadcast packets from the external switches 224, 226 on links 236, 238, 240, and 242. To simplify the description, operations of the second south bridge element 218 is omitted but it should be understood that the second south bridge element 218 may perform a similar operation as the first south bridge element 216 to filter and/or route broadcast data frames.

In step 602, the first south bridge element 216 receives a broadcast data frame from a connected external switch at an ingress uplink port. For example, the first south bridge element 216 may receive a broadcast data frame from connected external switches 224 or 226 at the port 228A or 228B, respectively. The broadcast data frame may be similar the example data frame 500 depicted in FIG. 5, except that the broadcast data frame specifies a broadcast settings, rather than an individual device address, in the destination address 502 field of the packet header.

In step 604, the south bridge element 216 processes the received broadcast data frame and extracts the LN and VLAN tag from the broadcast data frame. In step 606, the south bridge element 216 selects a row in a VLAN table using the extracted LN and VLAN tags. In some embodiments, the south bridge element 216 may use VLAN and LN assignments 256 of link table 254, which may be a matching copy of the link table 254 existing at the north bridge element 212, but stored at the south bridge element 216.

In step 608, the south bridge element 216 selects a column in the VLAN table using a source address of the received broadcast data frame. For example, the south bridge element 216 may has the source MAC address of the received broadcast data frame (e.g., similar to source address 504 in FIG. 5) to select a column in the VLAN table.

In step 610, the south bridge element 218 identifies an MLAG from the table cell of the VLAN table selected by steps 606 and 608. For example, referring to the example VLAN table shown in FIG. 5, the south bridge element 218 may identify that the received broadcast data frame is associated with MLAG 244 (identified as "MLAG A") or MLAG 246 (identified as "MLAG B").

In step 612, the south bridge element 218 determines whether the ingress port on which the broadcast data frame arrived belongs to the MLAG identified by the VLAN table lookup in step 610. In step 614, responsive to determining that the ingress port of the broadcast data frame belongs to the identified MLAG, the south bridge element 218 forwards the broadcast packet on the LRI 210. Otherwise, in step 616, the south bridge element 218 discards the broadcast packet. For example, if a source address of the received broadcast data packet is hashed and selects MLAG B from the VLAN table, the bridge element only forwards those broadcast data frames received on a link belonging to MLAG B (e.g., ports 228B and 230B).

According to one embodiment, the controlling bridges 220, 222 are configured to maintain a state of each uplink port (e.g., ports 228A, 228B, 230A, 230B) within their respective chassis 106. Any time a port changes state, the controlling bridge responsible for the port sends a port state message to the other controlling bridges via the LRI network 210. In one embodiment, one controlling bridge may notify other controlling bridges in the distributed virtual bridge 108 when syncing ports with an external switch to maintain that only in-sync ports may be included in a LAG. For example, the second controlling bridge 222 may sync its ports 230B with the external switch 226 and may notify the first controlling bridge 220 when the port 230B is in sync. Further, if the port 230B goes out of sync with the external switch 226, the second controlling bridge 222 may notify the first controlling bridge 220 (e.g., via LRI 210) that the port 230B is out of sync.

Figure 7:
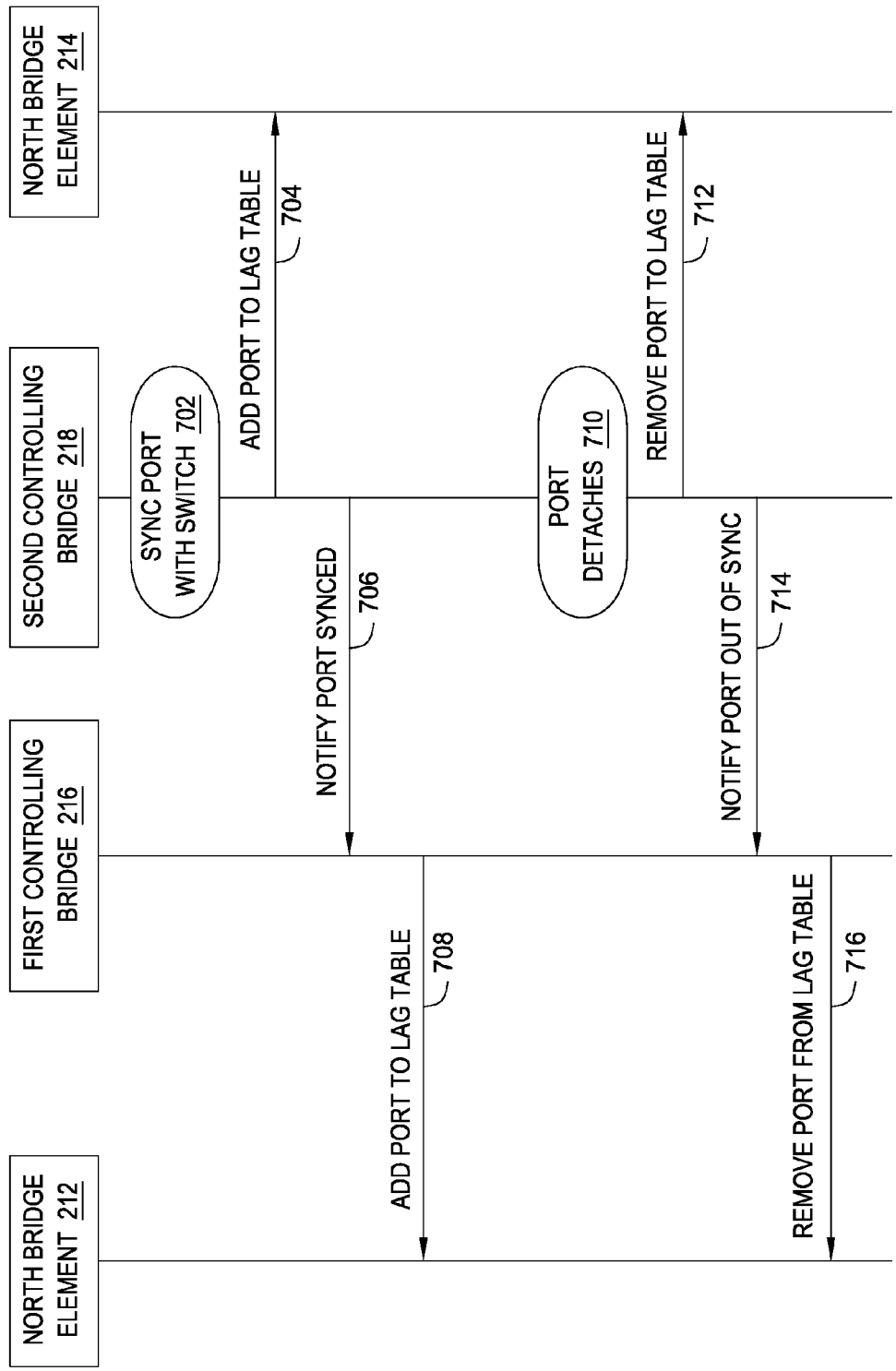
FIG. 7 is a sequence diagram of an operation for managing distributed bridge elements, according to an embodiment of the disclosure.

FIG. 7 is a sequence diagram illustrating the component interactions performed to program the LAG tables in the north bridge elements 212, 214. The controlling bridges 220, 222 are programmed to update address data 252 at north bridge elements 212, 214 based any received state updates for ports 228A, 228B, 230A, 230B via LRI network 210. In some embodiments, the controlling bridges 220, 222 update the address data 252 (e.g., LAG tables) in all north bridge elements to maintain consistency between the address data 252 in all north bridge elements within the distributed virtual bridge 108. In one implementation, UDP may be used to transport messages between the controlling bridges 220, 222.

In the example shown, at 702, the second controlling bridge 222 has synced the port 230B with its LACP partner (e.g., the external switch 226.) At 704, the second controlling bridge 222 adds the port 230B to the LAG table (e.g., port group information) in the second north bridge element 214 and to any other north bridge elements within the second chassis 106. At 706, the second controlling bridge 222 sends a port state message to the first controlling bridge 220 indicating that the port is in sync. At 708, the first controlling bridge adds the port to the LAG table (e.g., port group information 260) of the first north bridge element 212 and any other north bridge elements within the first chassis 106.

At 710, for example, at some time later, second controlling bridge 222 may determine that one or more ports is be out of sync with the LACP partner (e.g., the external switch 226). At 712, the second controlling bridge 222 removes the port from the LAG table of the second north bridge element 214 and from the LAG tables of any other north bridge elements within the second chassis 106. At 714, the second controlling bridge 222 sends a port state message to the first controlling bridge 220 indicating that the port is out of sync. At 716, the first controlling bridge 220 updates the address data 252 to remove the port from the LAG table (e.g., port group information 260) of the first north bridge element 212 and any other north bridge elements existing within the first chassis 106.

Figure 8:
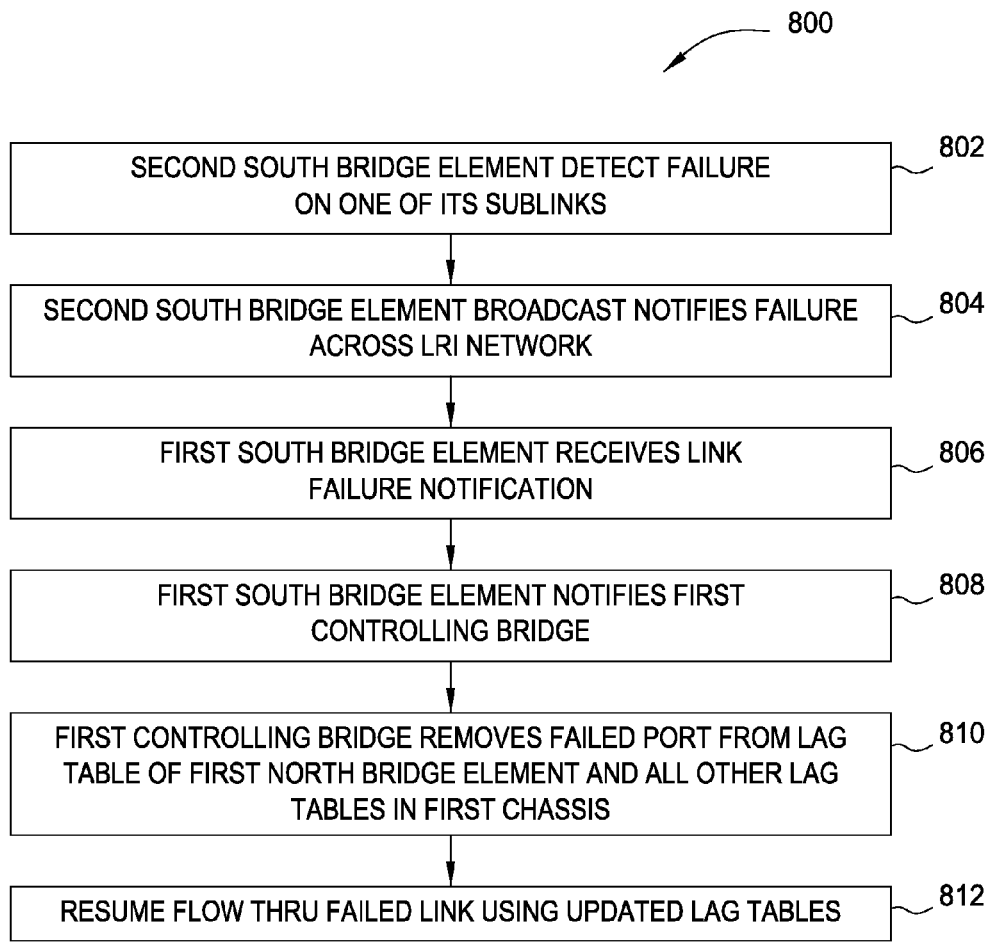
FIG. 8 illustrates a method for managing distributed bridge elements when a link fails, according to an embodiment of the disclosure.

FIG. 8 illustrates a method for managing distributed bridge elements when a link fails, according to an embodiment of the disclosure. At 802, the second south bridge element 218 detects failure of one of its links (e.g., any one of links 240, 242 at ports 230A, 230B). At 804, the second south bridge element 218 broadcasts a notification failure across the LRI network 210. In some embodiments, the second south bridge element 218 may use a hardware mechanism to broadcast failure of one or more sub links across the LRI network 210, an example of which is described in U.S. patent application Ser. No. 12/767,174, filed Apr. 26, 2010, entitled "Distributed Link Aggregation."

At 806, the first south bridge element 216 receives the link failure notification from the second south bridge element 218 via the LRI network 210. At 808, the first south bridge element 216 notifies the first controlling bridge 220 of the link failure notification. At 810, the first controlling bridge 220 removes the failed port from the address data 252 (e.g., the LAG table) of the first north bridge element 212 and from any other LAGs tables within the first chassis 106. To simply the description, descriptions of updates to the LAG tables in the second chassis 106 are not shown, but it should be understood that north bridge elements within the second chassis 106 are similarly updated by the second controlling bridge 222.

At 812, all packet flow that was previous using the failed link are resumed and are automatically rebalanced to an operating link using the method for forwarding data frames described in conjunction with FIGS. 4 and 5. In one embodiment, if a flow moves from one MLAG to another MLAG (e.g., MLAG 244 to MLAG 246), a gratuitous ARP may be broadcast on the appropriate VLANs to quickly update the link tables (e.g., link table 242) in the north bridge elements 212, 214 and other components of the distributed virtual bridge 108.

Accordingly, the distributed architecture and described multi-chassis link aggregation techniques provide improved redundancy and fault tolerance. If any or all south bridge components in a chassis fail, the computers (e.g., server computers 102) in the north portion of each chassis do not lose network connectivity, since any flows using the failed sub links may be rebalanced to other operational sub links belonging to other chassis. It should be understood that although FIG. 8 illustrates the failure of a single sub link, embodiments of the present disclosure may be extended to handle other types of failures, such as failure of a south bridge element (e.g., south bridge elements 216, 218), software or firmware failure in a chassis (e.g., chassis 106), chassis or half-chassis failure, and/or administrative shutdown of a chassis.

While the foregoing is directed to embodiments of the present disclosure, other and further embodiments of the disclosure may be devised without departing from the basic scope thereof, and the scope thereof is determined by the claims that follow.

What is claimed is:

1. A method of routing a data frame through a network system having a plurality of chassis, the method comprising:

generating a unified link aggregation group comprised of a plurality of link aggregation groups mapped to a same virtual local area network (VLAN), wherein the unified link aggregation group is treated as a single logical link from a perspective of a networked element;

receiving a data frame from the networked element to be forwarded to the VLAN;

determining one of the plurality of link aggregation groups of the unified link aggregated group based at least in part on a source address of the received data frame, wherein each link aggregation group includes a first sub link from one of the plurality of chassis and a second sub link from another one of the plurality of chassis;

selecting one of the plurality of sub links from the determined link aggregation group based on routing information of the data frame; and transmitting the data frame on the selected sub link.

2. The method of claim 1, wherein the determining the link aggregation group comprises:

extracting VLAN information from the received data frame;

extracting the source address from the received data frame; and identifying one of the plurality of link aggregation groups according to the extracted VLAN information and source address.

3. The method of claim 1, wherein the determining the link aggregation group comprises:

selecting a cell in a VLAN assignment table, wherein the cell contains an identifier for one of the plurality of link aggregation groups.

4. The method of claim 3, wherein the selecting the cell further comprises:

selecting a row in the VLAN assignment table according to VLAN information contained within the received data frame; and selecting a column in the VLAN assignment table according to a hash value generated from the source address of the received data frame, wherein the source address comprises a source MAC address.

5. The method of claim 1, wherein the selecting the one of the plurality of sub links comprises:

extracting frame data from a frame field of received data frame; and identifying one of the plurality of sub links according to the determined link aggregation group and the extracted frame data.

6. The method of claim 1, wherein the selecting the one of the plurality of sub links comprises:

selecting a cell in a link aggregation table, wherein the cell contains an identifier for one of the plurality of sub links.

7. The method of claim 6, wherein the selecting the cell in the link aggregation table further comprises:

selecting a row in the link aggregation table according to the determined link aggregation group;

selecting a column in the link aggregation group according to a hash value generated based on frame data from at least one frame field of the received data frame.

8. A method of routing a data frame through a network system having a plurality of chassis, the method comprising:

generating a unified link aggregation group comprised of a plurality of link aggregation groups mapped to a same virtual local area network (VLAN), wherein the unified link aggregation group is treated as a single logical link from a perspective of a networked element;

receiving a broadcast data frame at an ingress port associated with the VLAN;

identifying one of a plurality of link aggregation groups of the unified link aggregation group, wherein each link aggregation group includes a first sub link from one of the plurality of chassis and a second sub link from another one of the plurality of chassis;

determining whether the ingress port belongs to the identified link aggregation group;

responsive to determining that the ingress port belongs to the identified link aggregation group, forwarding the broadcast data frame; and responsive to determining that the ingress port does not belong to the identified link aggregation group, discarding the broadcast data frame.

9. The method of claim 8, wherein the identifying the link aggregation group comprises:

extracting VLAN information from the received broadcast data frame;

extracting a source address from the received broadcast data frame; and identifying one of the plurality of link aggregation groups according to the extracted VLAN information and source address.

10. The method of claim 8, wherein the determining whether the ingress port belongs to the identified link aggregation group comprises:

identifying a plurality of ports belonging to the identified link aggregation group according to a link aggregation table.

11. A system having a plurality of chassis, comprising:

a plurality of server computers;

a plurality of bridge elements coupled to the plurality of server computers, wherein the plurality of bridge elements are configured to generate a unified link aggregation group comprising a plurality of link aggregation groups mapped to a same virtual area network (VLAN), wherein the unified link aggregation group is treated as a single logical link from a perspective of a networked element;

wherein the plurality of bridge elements are configured to receive from the networked element a data frame to be forwarded to the VLAN and wherein the plurality of bridge elements are configured to execute a routing operation comprising:

determining one of the plurality of link aggregation groups of the unified link aggregation group based at least in part on a source address of the data frame, wherein each link aggregation group includes a first sub link from one of the plurality of chassis and a second sub link from another one of the plurality of chassis;

selecting one of the plurality of sub links from the determined link aggregation group based on routing information of the data frame; and transmitting the data frame on the selected sub link.

12. The system of claim 11, wherein the plurality of bridge elements are further configured to extract VLAN information and the source address from the received data frame, and identify one of the plurality of link aggregation groups according to the extracted VLAN information and the source address.

13. The system of claim 11, wherein the plurality of bridge elements are further configured to select a cell in a VLAN assignment table, wherein the cell contains an identifier for one of the plurality of link aggregation groups.

14. The system of claim 13, wherein the plurality of bridge elements are further configured to select a row in the VLAN assignment table according to VLAN information contained within the received data frame, and select a column in the VLAN assignment table according to a hash value generated from the source address of the received data frame, wherein the source address comprises a source MAC address.

15. The system of claim 11, wherein the plurality of bridge elements are further configured to extract frame data from a frame field of received data frame, and identify one of the plurality of sub links according to the determined link aggregation group and the extracted frame data.

16. The system of claim 11, wherein the plurality of bridge elements are further configured to select a cell in a link aggregation table, wherein the cell contains an identifier for one of the plurality of sub links.

17. The system of claim 16, wherein the plurality of bridge elements are further configured to select a row in the link aggregation table according to the determined link aggregation group, and select a column in the link aggregation group according to a hash value generated based on frame data from at least one frame field of the received data frame.

18. The system of claim 11, wherein the plurality of bridge elements are further configured to perform a second routing operation, the operation comprising:
   receiving a broadcast data frame at an ingress port associated with a virtual local area network (VLAN);
   identifying one of a plurality of link aggregation groups mapped to the VLAN, wherein each link aggregation group includes a first sub link from one of the plurality of chassis and a second sub link from another one of the plurality of chassis;
   determining whether the ingress port belongs to the identified link aggregation group;
   responsive to determining that the ingress port belongs to the identified link aggregation group, forwarding the broadcast data frame.
   responsive to determining that the ingress port does not belong to the identified link aggregation group, discarding the broadcast data frame.

19. The system of claim 18, wherein the plurality of bridge elements are further configured to extract VLAN information and a source address from the received broadcast data frame, and identify one of the plurality of link aggregation groups according to the extracted VLAN information and source address.

20. The system of claim 18, wherein the plurality of bridge elements are further configured to identify a plurality of ports belonging to the identified link aggregation group according to a link aggregation table.

* * * * *